May 22, 1956 K. HAGENHAUS ET AL 2,747,033

APPARATUS FOR TESTING SIGNAL IMPULSE GENERATORS

Filed July 30, 1952 2 Sheets-Sheet 1

Inventors,
Kurt Hagenhaus, &
Gerd Tiesler
By [signature] Atty

APPARATUS FOR TESTING SIGNAL IMPULSE GENERATORS

Filed July 30, 1952

Inventors.
Kurt Hagenhaus, &
Gerd Tiesler.
By. [signature] Atty.

United States Patent Office 2,747,033

Patented May 22, 1956

2,747,033

APPARATUS FOR TESTING SIGNAL IMPULSE GENERATORS

Kurt Hagenhaus, Berlin-Siemensstadt, and Gerd Tiesler, Berlin-Charlottenburg, Germany, assignors to Siemens & Halske, Aktiengesellschaft, Munich, Germany, a German corporation Application July 30, 1952, Serial No. 301,646

Claims priority, application Germany August 18, 1951

16 Claims. (Cl. 179—175.2)

This invention is concerned with apparatus for supervising and testing the operation of marker impulse generators in a telephone or other signalling system. The marker impulse generator may be of the type described in the copending application Serial No. 301,647, filed July 30, 1952. The impulses produced by such a generator may be used for switching control purposes, e. g. in a telephone system.

The impulses in a generator of the type indicated above are produced by suitable switching means, e. g., control contacts disposed in distinct first and second groups which are for coordinate operation interconnected by associated circuit means. The control contacts and circuit means and also additional control means coacting therewith must be tested and supervised in order to ascertain and to secure proper operation.

The object of the invention is to provide for such impulse generators testing and supervising apparatus comprising switching devices, e. g., rotary switches, for connecting potentials required for the generation of the impulses from the respective groups of control contacts to testing means so as to ascertain coincidence or simultaneous occurrence of the impulses. One of these switches is adapted to successively connect with the testing means potentials of the first group of control contacts and the other switch is adapted to successively connect with the testing means the potentials of the second group of control contacts which coact in a coordinate manner with the control contacts of the first group.

Figure 1:
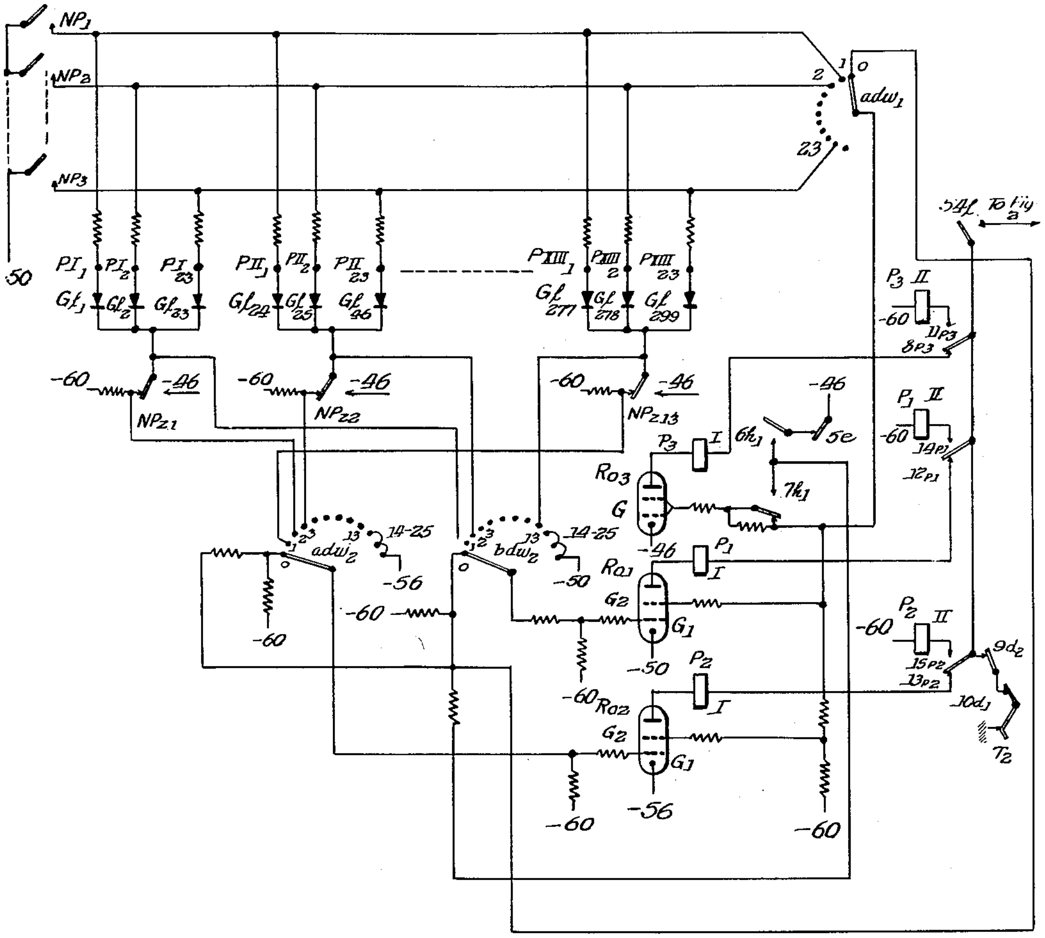
Figure 2:
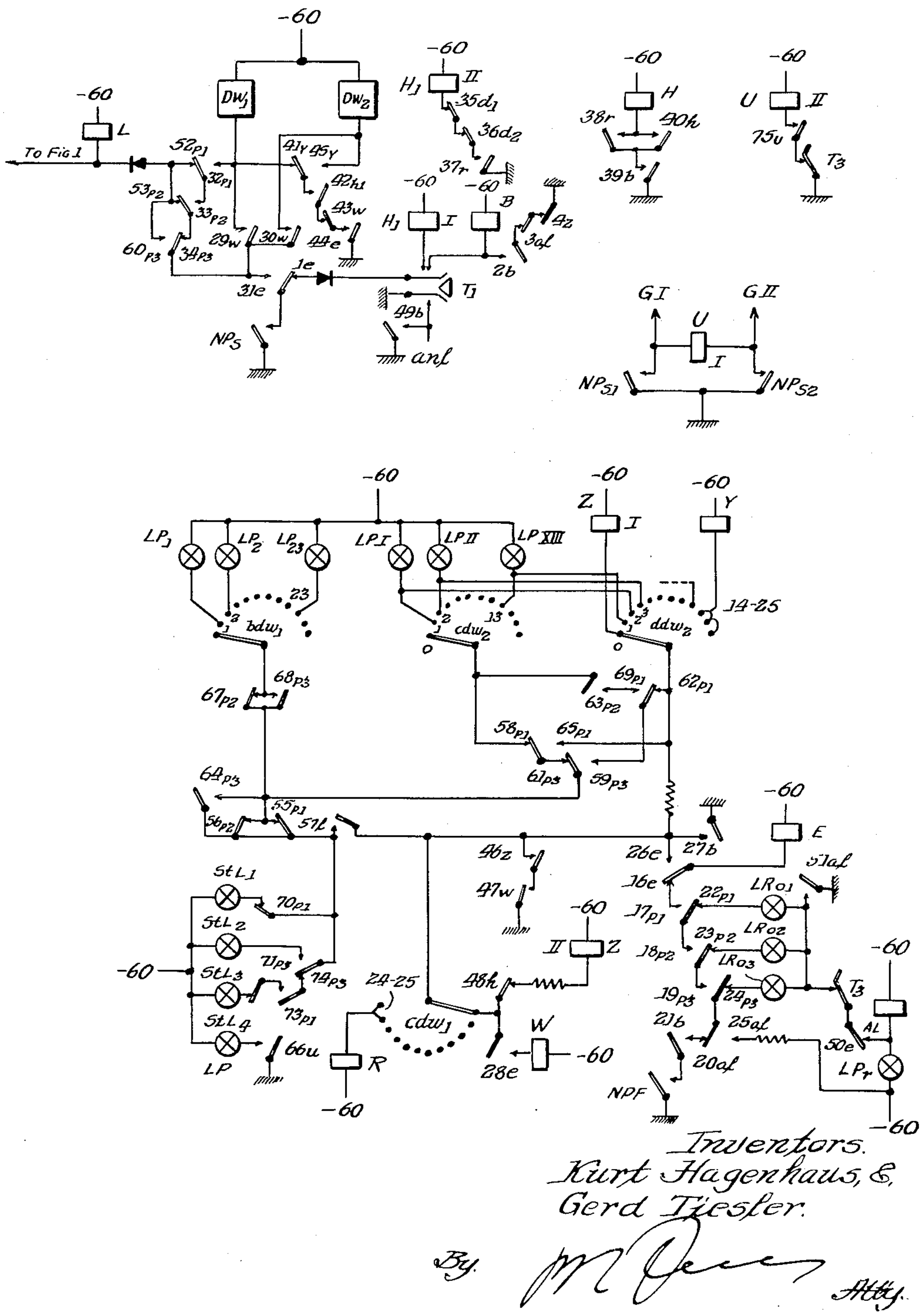

Details of the invention will be described with reference to the accompanying drawings Figs. 1 and 2 showing an embodiment thereof. The drawings should be placed side by side, with Fig. 2 at the right of Fig. 1 and with the correspondingly referenced line in alignment.

The impulse generator, the operation of which is to be supervised and tested, comprises first switching means or control contacts NP1 . . . NP23 which are in a certain time sequence repeatedly successively actuated by suitable means, e. g. by rotary cam means (not shown) and second switching means or control contacts NP*z*1 . . . NP*z*13, which are by similar means successively actuated in a different time sequence. The operation is such that the contacts NP1 . . . NP23 are successively actuated during the time when one of the contacts NP*z*1 . . . NP*z*13 is in operated position. Accordingly, contacts NP1 . . . NP23 will be successively actuated during the time when the contact NP*z*1 is in its actuated position. The contact NP*z*1 is thereafter restored to normal position, in which it is shown, and contact NP*z*2 is actuated to alternate operating position. The contacts NP1 . . . NP23 are, during the operating interval of contact NP*z*2, again successively actuated as before. The successive actuation of the contacts NP1 . . . NP23 is repeated for the duration of operation of each of the successively actuated contacts NP*z* (only some of these contacts being shown in the drawing) until contact NP*z*13 is finally actuated, when the contacts NP1 . . . NP23 are again successively actuated for the duration of the actuation of contact NP*z*13. This completes the operating cycle of the impulse generator.

G11 . . . G1299 indicate rectifiers disposed in the circuits extending between the contacts $NP_1$–$NP_{23}$ and NP*z*1–NP*z*13. The designations PI1 . . . PXIII23 indicate terminals at which the impulses produced by the generator appear during the operation thereof and may therefore be termed impulse receiving terminals.

In addition to the two groups of control contacts NP1 . . . NP23 and NP*z*1 . . . NP*z*13 there are provided contacts NP*s* (right hand upper section of the drawing) which produce synchronizing impulses, and contacts NP*f* (lower right hand corner of the drawing) for producing successive switching and stepping impulses. These contacts are also operated by suitable means, e. g. rotary cam means (not shown). The contacts NP*s* are actuated upon starting the rotation of the cam means which operate the control contacts NP1–NP23, and the contacts NP*f* are similarly operated incident to the actuation of each of the control contracts NP*z*1 . . . NP*z*13.

There are also provided among other means, the rectifiers such as indicated G11, G12, G123—G124, G125, G146—G1277, G1278, G1299. The remaining rectifiers, as well as resistances included in the impulse generator circuits, have been omitted to avoid encumbering the drawing. The manner of operation by which the impulses are produced at the terminals $PI_1$ . . . $PXIII_{23}$ is described in detail in the previously mentioned copending application Ser. No. 301,647.

The supervising and testing of the operations of the control contacts NP1 . . . NP23 and NP*z*1 . . . NP*z*13, in their resting as well as in their actuated positions, is in accordance with the invention accomplished by the apparatus shown in the drawing which includes two rotary switches comprising the stepping magnets DW1 and DW2. The stepping magnet DW1 operates the wipers *adw*1, *bdw*1 and *cdw*1. These switch wipers are advanced in step with the actuation of the impulse generator contacts NP1 . . . NP23. The stepping magnet DW2 operates the wipers *adw*2, *bdw*2, *cdw*2, and *ddw*2. These latter wipers are advanced in step with the actuation of the contacts NP*z*1 . . . NP*z*13. Lamps LP1 . . . LP23 and LPI . . . LPXIII are provided for signalling specific circuit points where faults are discovered, e. g., the absence of a marker impulse on a certain impulse receiving terminal. Lamps S*t*L1 . . . S*t*L4 are provided for coaction with the lamps LP1 . . . LP23 and LPI . . . LPXIII, to signal the specific nature of faults discovered in the course of the testing. The lamps shown at the right hand lower corner of the drawing, marked LR*o*1, LR*o*2, LR*o*3, are operated to indicate failure of the corresponding discharge tubes R*o*3, R*o*1, R*o*2.

The operation is as follows:

The supervising and testing apparatus is started by actuating the key T1 (upper right hand section of the drawing). Ground is thereby connected to the start conductor *an*1 for starting the drive of the previously mentioned rotary cam means which operate the various contacts. The contact NP*s* is thereupon operated and relays B and H1 (winding I) will be energized from ground on NP*s*, contact 1*e*, rectifier, contacts of key T1, windings of H1I and B to −60. Relay B operates its contact 2*b* to connect itself in a holding circuit over 3*a*1 to ground at 4*z*. At contact 49*b* relay B completes an alternate circuit for maintaining the operation of the drive circuit over the conductor *an*1 independent of the key T1. Relay H1 closes its contacts 6*h*1 and 7*h*1 to connect to the grids G of the tube R*o*3 potential which causes the tube to become conductive. Relay P3 energizes now over its winding I which is disposed in the anode circuit of the tube, the energizing circuit extending over contacts 8*p*3, 9*d*2, 10*d*1, to ground at key T2. Relay P3 actuates its contact 11*p*3, thereby disconnecting the circuit extending over its winding I and completing a holding circuit over its winding P3II. The tube R*o*3 extinguishes. A certain potential has meanwhile been placed on the grids G2 of the tubes R*o*1 and R*o*2 over a circuit including the wiper *adw*1 which is in zero position. A corresponding potential has also been placed on the grids G1 of the tubes R*o*1 and R*o*2, over the wipers *bdw*2 and *adw*2 respectively. These tubes, R*o*1 and R*o*2, now become conductive.

Relay P1 (winding I) in the anode circuit of the tube R*o*1 energizes over contacts 12*p*1, 9*d*2, 10*d*1, to ground at key T2, and relay P2 (winding I) in the anode circuit of tube R*o*2, energized over contacts 13*p*2, 9*d*2, 10*d*1, to ground at key T2. The relays P1 and P2 operate their respective contacts 14*p*1 and 15*p*1 and thus complete holding circuits over their windings P1II and P2II. The cam controlled contact NP*f* (lower right hand corner of the drawing) is closed at the time of these operations and relay E energizes from ground on NP*f*, 21*b*, 20*a*1, 19*p*3, 18*p*2, 17*p*1, 16*e*, winding of the relay E to –60. Relay E operates its contact 26*e*, thereby connecting itself in a holding circuit to ground at closed contact 27*b*.

The above described switching operations take place if the supervising and testing device is in proper operating condition for carrying out the testing. If it is not in proper operating condition, e. g. due to failure of a tube to operate, thereby preventing actuation of one or more of the relays P1 . . . P3, relay A1 (lower right hand corner of drawing) will become energized over a circuit including a contact such as 24*p*3, 23*p*2, and 22*p*1, and the corresponding signal lamp LR*o*1, LR*o*2 or LR*o*3, key T3, contact 50*e*, winding of A1 to –60. Signal lamp LP*r* is at the same time operated in parallel with the relay A1. The latter relay operates its contacts 51*a*1 and 25*a*1 to provide a holding circuit for its own winding and to maintain the signal lamp operated, which indicates the failure of a tube. These circuits may subsequently be opened by actuating the key T3.

As already described, relay E is energized if the supervising and testing apparatus is in operating condition. Upon closing its contact 28*e*, relay E causes energization of relay W (right hand bottom section of drawing) from –60, winding of relay W, 28*e*, wiper *cdw*1, in zero position, contact 27*b* to ground. Relay W closes its contact 29*w* to produce a stepping impulse for the rotary stepping magnet DW1 (right hand upper section of drawing) from ground at cam operated contact NP*s*, 31*e*, 29*w*, DW1, to –60, so as to cause this magnet to advance its wipers *adw*1 . . . *cdw*1. The stepping magnet DW2 for the wipers *adw*2 . . . *ddw*2 receives a similar stepping impulse due to the operation of contact 30*w* of the relay W to step its wipers to position 1 Relay W deenergizes when the wiper *cdw*1 leaves its zero position and the relays P1 . . . P3 are deenergized by the opening of the contact 10*d*1 which is actuated by the stepping magnet DW1.

The impulse generator has been started over the start conductor *an*1, as already described, and therefore is operating. The cam controlled contact NP*z*1 is accordingly placed in its alternate or working position in which it is maintained for an interval during which the contacts NP1 . . . NP23 are for the first time successively actuated. Responsive to closure of NP1 an impulse is produced which becomes effective on the grids of the tube R*o*3 and on the grids G2 of the tubes R*o*1 and R*o*2 over a circuit including wiper *adw*1 in position 1. The tube R*o*3 is not affected by this impulse. Provided that the cam controlled contact NP*z*1 is in its working position properly operable, the grid G1 of tube R*o*1 will receive a potential over the wiper *bdw*2 in position 1 to make this tube conductive. The contact NP1 also connects current from –50 to the contact NP*z*13, over the rectifier G1277, causing an impulse at the grid G1 of tube R*o*2 over wiper *adw*2 in position 1 to make this tube conductive. Relays P1 and P2 in the anode circuits of the tubes R*o*1 and R*o*2 become energized and place their windings II in holding circuits as described before. The tubes R*o*1 and R*o*2 are again extinguished by the opening of the contacts 12*p*1 and 13*p*2.

The apparatus thus ascertains in position 1 of the wipers *adw*1 . . . *cdw*1 and *adw*2 . . . *ddw*2, whether the cam controlled contacts NP1 and NP*z*1 are in proper working order and whether the cam controlled contact NP*z*13 is in proper normal position, thereby also testing the proper conductivity of the rectifier G1277.

The rotary stepping magnet DW1, is energized upon next successive actuation of the cam controlled contact NP*s* from ground on N*ps*, 31*e*, 34*p*3, 33*p*2, 32*p*1, DW1 to –60 and wipers *adw*1 . . . *cdw*1 are therefore advanced to position 2. Contact 10*d*1 is opened upon energization of the rotary stepping magnet DW1, thus deenergizing the relays P1 and P2 by opening the circuts of their holding windings.

The cam controlled contact NP2 is thereafter closed and if its operation is proper a potential will be connected to the grids G2 of the tubes R*o*1 and R*o*2, over wiper *adw*1 in position 2, while corresponding potentials are connected to the grids G1 of these tubes over the wipers *bdw*2 and *adw*2, as before. These tubes become again conductive, causing actuation of the relays P1 and P2 which connect their windings II in holding circuits, thereby disconnecting the tubes, as already described. A test potential is also connected to the cam controlled contact NP*z*13 (in resting position) over the rectifier G1278.

Accordingly, the apparatus tests in position 2 of the wipers whether the cam controlled contacts NP2 and NP*z*1 are in proper working condition and whether the contact NP*z*13 is in proper normal position, and further, whether the rectifier G1278 is properly operative.

If all these elements are in proper working order, the wipers *adw*1 . . . *cdw*1 will be advanced to the next position, so as to ascertain in a similar manner the operating conditions of the contacts NP3, NP*z*1, NP*z*13 and corresponding rectifier. These test operations are repeated from position to position of the wipers until the wipers *adw*1 . . . *cdw*1 are in position 23 to test the operating conditions of the associated cam controlled contacts NP23, NP*z*1 and the rectifier G1299. The wipers are then stepped to position 24.

Relay R (bottom right hand section of drawing) is in position 24 of the wiper *cdw*1 energized from –60, winding of R, wiper *cdw*1 to ground at contact 27*b*. Relay R closes a circuit for energizing relay H (upper right hand corner of drawing) by actuating its contact 38*r*, the circuit extending from ground at contact 39*b*, 38*r*, winding of H to –60. Relay H actuates its contact 40*h*, thereby connecting its own winding in a holding circuit independent of contact 38*r*. Relay H1 is now energized over its winding II in a circuit extending from –60, winding II of H1, 35*d*1, 36*d*2, 37*r* to ground. The rotary stepping magnet DW1 receives an impulse over a circuit from –60, DW1, 41*y*, 42*h*1, 43*w*, 44*e*, to ground and steps its wipers *adw*1 . . . *cdw*1 to position 25. Contact 35*d*1, operated by the stepping magnet DW1, disconnects the winding II of the relay H1 and this relay deenergizes (winding I of relay H1 has been disconnected previously upon release of the key T1). Contact 42*h* is opened responsive to deenergization of H1 and the stepping magnet DW1 accordingly deenergizes. The interplay between the stepping magnet DW1 and the relay H1 is repeated until the wipers *adw*1 . . . *cdw*1 are again in position zero. Relay R deenergizes when the wiper *cdw*1 leaves position 25.

In the zero position of these wipers relay W is again operated in a circuit from −60, winding of W, contact 28*e*, wiper *cdw*1 to ground on 27*b*. The rotary magnet DW1 receives another stepping impulse over a circuit from −60, DW1, 29*w*, 31*e*, NP*s* to ground and the wipers *adw*1 . . . *cdw*1 are stepped to position 1. The rotary magnet DW2 is now also energized from −60, DW2, 30*w*, 31*e*, NP*s*, to ground, advancing the wipers *adw*2 . . . *ddw*2 to position 2.

Over the wipers *adw*2 in position 2 will now be tested the cam controlled contact NP*z*1 in its normal position and over wiper *bdw*2 will be tested the operating condition of the cam controlled contact NP*z*2 in its actuated position, all during the successive actuation of the cam controlled contacts NP1 . . . NP23. The wipers *adw*1 . . . *cdw*1 are, during such testing, successively advanced in step with the successive actuation of the contacts NP1 . . . NP23, as already described. The various rectifiers, which are correspondingly switched-in, are also coincidently tested, as explained before. The tubes R*o*1 and R*o*2 operate during this test phase likewise, as already described, receiving the potentials for their grids G1 over the wipers *adw*2 and *bdw*2.

After completing this testing phase, the wipers *adw*1 . . . *cdw*1 are again advanced from their positions 24 and 25 to the zero position and the wipers *adw*2 . . . *ddw*2 are thereafter advanced to position 3 to repeat the test for proper coordinate cooperation of the contacts NP1 . . . NP23, with the next successive contact, such as NP*z*2, etc. etc. to NP*z*13.

Upon completion of the testing of the cooperation of the contacts NP1 . . . NP23 with the contact NP*z*13, the wipers *adw*2 . . . *ddw*2 will be in position 13. The wipers *adw*1 . . . *cdw*1 are again advanced from their positions 24–25 to zero position, relay R being energized in positions 24–25 of wiper *cdw*1. The relay W thereafter energizes again over wiper *cdw*1 to ground on contact 27*b* causing operation of the rotary magnet DW1 which steps its wipers *adw*1 . . . *cdw*1 to position 1.

The rotary magnet DW2 is also energized, responsive to operation of relay W and advance its wipers *adw*2 . . . *ddw*2 to position 14. Relay Y (right hand center section of drawing) is energized in position 14 of wiper *ddw*2 and remains energized through to position 25 thereof in a circuit from −60, winding of Y, wiper *ddw*2 to ground on contact 27*b*.

The wipers *adw*1 . . . *cdw*1 are in step with the actuation of the cam controlled contacts NP1 . . . NP23 advanced from position 1 to position 24, as already explained. The potential required for the firing of the tubes R*o*1 . . . R*o*2, which is conducted to the grids G1 of these tubes, is obtained over the wipers *adw*2 and *bdw*2 in positions 14 to 25 thereof. Relay R will again energize when the wiper *cdw*1 reaches position 24, thereby again closing its contact 37*r* to actuate relay H1 by energizing its winding II. Relay Y being operated and having closed its contact 45*y* in the circuit of the rotary magnet DW2, this magnet will receive a stepping impulse after closure of contact 42*h*1 and will advance its wipers *adw*2 . . . *ddw*2. Contact 36*d*2 is opened by the actuation of the magnet DW2, thereby disconnecting the winding II of relay H1. The interplay between the rotary magnet DW2 and relay H1 advances the wipers *adw*2 . . . *ddw*2 to zero position. The wiper *ddw*2 leaves position 25 and thereby causes deenergization of relay Y.

Relay Z (left of relay Y) now operates in a circuit from −60, winding I of Z, wiper *ddw*2 to ground at 27*b*. At contact 4*z*, relay Z disconnects relay B and the latter disconnects H by opening its contact 39*b*. Relay E continues to hold over its own contact 26*e* and closes contact 46*z* to ground at 47*w*. The rotary magnet DW1 is now in interplay with the relay H1 actuated until its wipers *adw*1 . . . *cdw*1 are advanced to zero position. Relay R becomes deenergized and since contact 48*h* is closed, the winding II of relay Z is energized in opposition to winding I, over wiper *cdw*1 in zero position, and Z accordingly deenergizes. Other relays which are at this instant operated, thereupon become deenergized.

The supervisory and testing apparatus has in this manner ascertained the proper working condition of the impulse generator. The testing may be repeated as desired, in accordance with exchange regulations.

The potentials required for the testing as indicated in the drawing are tapped from the exchange battery.

The following faults may be discovered in the course of the testing:

1. *Absence of the marker impulse on one of the terminals PI1 . . . PXIII23.*—The reason for the failure of a marker impulse to appear at one or the other of the terminals may be due to the failure of one of the cam controlled contacts NP1 . . . NP23. In such a case there will not occur the impulse for the grids G2 of the tubes R*o*1 and R*o*2 which is in proper operation conducted thereto over the wiper *adw*1 in the corresponding positions 1–23 thereof. The relays P1 and P2 therefore fail to operate. The relay L (top center of drawing) will now be energized in a circuit from −60, winding of L, rectifier, contacts 53*p*2, 34*p*2, 31*e*, NP*s* to ground. Relay L operates its contact 541 (shown at the left thereof) to connect its winding in a holding circuit to ground at key T2. One of the signal lamps LP1 . . . LP23, corresponding to the respective faulty contact NP1 . . . NP23, will now be operated over the corresponding position of the wiper *bdw*1, in a circuit extending from −60, affected signal lamp, contacts 67*p*2, 55*p*1 or 56*p*2, 571 to ground at 27*b*. In addition, depending upon the particular position of the wiper *cdw*2 on one of its bank contacts 1–13, one of the signal lamps LPI . . . LPXIII will be operated over contacts 58*p*1, 61*p*3, 55*p*1 or 56*p*2, 571 to ground at 27*b*.

The operation of one of the signal lamps LP1 . . . LP23 in conjunction with one of the signal lamps LPI . . . LPXIII, designates the affected signal receiving terminal PI1 . . . PXIII23, on which the marker impulse failed to appear.

The signal lamp S*t*L1 is at such same time operated over contacts 70*p*1, 571, to ground at 27*b*, as a general signal to indicate that a marker impulse has failed to appear.

A substitute impulse generator may now be put in operation and the faulty generator may be checked and put in order. The key T2 is operated to deenergize the relay L, thereby causing disconnection of the operated signal lamps.

2. *Improper marker impulse at one of the terminals PI1 . . . PXIII23.*—Such condition may be caused by the failure of one of the cam operated contacts NP*z*1 . . . NP*z*13 to reach its full working position. In such a case there will not appear a corresponding impulse (over the wiper *bdw*2) on the grid G1 of the tube R*o*1 and such tube will not fire and thus fail to energize the relay P1. However, the required impulse for the grid G1 of the tube R*o*2 will be present by way of the wiper *adw*2 (over which the normal or resting position of the cam controlled contacts NP*z*1 . . . NP*z*13 is tested), so that R*o*2 becomes conductive causing energization of relay P2.

Relay L now energizes again in a circuit from −60, winding of L, rectifier, contacts 52*p*1, 33*p*2, 34*p*3, 31*e* to ground at NP*s*. Relay L completes a holding circuit for its own winding at contact 541. After closure of contact 571, there will be operated one of the signal lamps LPI . . . LPXIII corresponding to the position of the wiper *cdw*2, i. e. corresponding to the cam controlled contact NP*z*1 . . . NP*z*13 which failed to operate. Contact 67*p*2 is open and the signal lamps LP1 . . . LP23 therefore remain at rest.

The resulting signal (one of the lamps LPI . . . LPXIII operated) designates the group of marker signal receiving terminals affected by the failure of the corresponding cam controlled contact NP*z*1 . . . NP*z*13.

The signal lamp StL1 is operated as described before under the subheading "1."

3. *Short circuit in one of the rectifiers G11 . . . G1299.*—If one of the rectifiers is short circuited, there will be, during the actuation of one of the associated cam controlled contacts NPz1 . . . NPz13, a steady potential on the impulse receiving terminal associated with the faulty rectifier. In the various operating positions of the wiper *adw*1 a potential will be connected to the grids G of the tube Ro3 causing this tube to become conductive to energize the relay P3. A potential is at such time also conducted to the grids G1 and G2 of the tubes Ro1 and Ro2, so that these tubes also become conductive to energize relays P1 and P2. Relays P1, P2, P3 being energized, the relay L will be energized from −60, winding L, rectifier, contacts 60*p*3, 31*e* to ground at NP*s*. One of the signal lamps LPI . . . LPXIII, which corresponds to the faulty circuit, will now be operated over a circuit including the wiper *cdw*2 and contacts 59*p*3, 69*p*1, 63*p*2. In addition the corresponding one of the signal lamps LP1 . . . LP23 is operated in a circuit including the wiper *bdw*1 and contacts 68*p*3, 64*p*3, 571, to ground at 27*b*. The operation of the two lamps indicates the particular circuit (impulse receiving terminal) containing the faulty rectifier. Signal lamp StL2 is in this case also operated over a circuit including contacts 71*p*3, 571, to ground at 27*b*, to indicate as a general signal that a rectifier is short circuited.

4. *One of the rectifiers G11 . . . G1299 is interrupted.*—The proper potentials will in such a case be conducted to the grids G2 of the tubes Ro1 and Ro2 but only Ro1 will become conductive because the proper firing potential for the grid G1 will be conducted only to this tube by way of wiper *bdw*2. Accordingly only relay P1 will become energized. The relay L will energize as before. One of the signal lamps LPI . . . LPXIII, which corresponds to the circuit containing the faulty rectifier, will be operated over wiper *ddw*2 after closure of contact 65*p*1, and the corresponding one of the signal lamps LP1 . . . LP23 will be operated over contacts 67*p*2 and wiper *bdw*1.

The particular lamps which are operated in this manner signal the circuit in which there is an interrupted rectifier. Lamp StL3 is in this case operated over contact 73*p*1 to signal the corresponding "rectifier interrupted" condition.

In case there are additional cam controlled contacts provided which are e. g. successively actuated prior to the operation of the contacts NP1 . . . N*p*23, to produce impulses for desired switching purposes, such additional contacts may also be tested and supervised. For example, four such additional contacts that may be provided may be connected to the contacts 14—17 of the bank controlled by wiper *bdw*2, so as to cause firing of the tube Ro1, if these contacts are in proper worker order. An auxiliary relay may in this case be connected with the bank contacts 14—17 to take care of the switching operations which control the stepping of the wipers *adw*2 . . . *ddw*2. Additional signal lamps may for such cases be provided which may be connected for operation over the wiper *cdw*2 to signal faults of the additional contacts.

Several contacts $NP_{s1}$ and $NP_{s2}$ are provided for load distributing reasons, serving switching control purposes for other exchange equipment cooperating with the impulse generator and subdivided into groups indicated at GI and GII (right hand upper section of drawing).

Between these contacts is disposed the relay U. This relay becomes, for the purpose of signalling, energized over one of the contacts responsive to failure of the other contacts to switch-in the signal lamp StL4 over the contact 66*u*. The relay U also closes its contact 75*u* (upper right hand corner of drawing) to connect its winding II in a holding circuit.

It may be mentioned in conclusion that electronic stepping means may be substituted for the stepping switches shown. Electronic switching means may also be substituted for the contact means NP1 . . . NP23, as is described in the previously mentioned copending application, Serial No. 301,647.

We claim:

1. Apparatus for testing the operation of signal impulse generators having a plurality of a first type switching means and an individual conductor extending from each of said first type switching means and having a plurality of groups of control conductors each group having a plurality of control conductors one for each of said individual conductors and connected with such first conductor and having an impulse receiving terminal connected with each control conductor and having a plurality of a second type switching means one for each group of said control conductors and having means for successively actuating said second type switching means to connect a potential to the associated group of control conductors and means for successively actuating said first type switching means to connect a potential successively to said individual conductors and therewith to said control conductors to produce impulses at said impulse receiving terminals of the group of control conductors associated with an actuated second type switching means, whereby impulses are successively produced at the impulse receiving terminals of the successive groups of control conductors; said apparatus comprising testing means, a first device for successively connecting to said testing means the potentials successively appearing on said individual conductors by the successive actuation of said first type switching means, and a second device for successively connecting to said testing means the potentials respectively connected by said second type switching means to the groups of control conductors respectively associated with said second type switching means, and means in said testing means for ascertaining the simultaneous occurrence of said potentials connected thereto.

2. Apparatus for testing the operation of an impulse generator having a plurality of groups of impulse receiving terminals each group comprising several terminals and having a plurality of first type switching means for successively connecting potentials to said terminals in each group and having second type switching means for successively connecting a potential to all said terminals in each group, the coincidence of said potentials on any of said terminals producing a signal impulse thereon; said apparatus comprising testing means, a first device for successively connecting to said testing means the potentials successively connected to said terminals by said first type switching means, a second device for successively connecting to said testing means the potentials successively connected to said groups of terminals by said second type switching means, supervising means in said testing means for testing for the coincidence of said potentials, means governed by said supervising means responsive to establishing coincidence of said potentials connected by said first and second type switching means for controlling the continuous operation of said first and second device, signalling means respectively individual to said first and said second type switching means, and circuit means controlled by said supervising means responsive to failure to establish coincidence due to failure of the respective switching means for operating the signal means corresponding thereto.

3. The apparatus defined in claim 2, wherein said testing means comprises a plurality of electron tubes, signal means respectively individual to said tubes, and circuit means responsive to failure of either of said tubes for operating the corresponding signal means.

4. The apparatus defined in claim 2, comprising a rectifier associated with each of said impulse receiving terminals, signal means common to a plurality of rectifiers, and circuit means controlled by said supervising means for actuating said last named signal means jointly with the signal means corresponding to the switching means which caused the failure to establish coincidence.

5. The apparatus defined in claim 2, comprising a pair of stepping switches respectively constituting said first and said second device, and means controlled by said stepping switches for governing the operation of said signal means.

6. The apparatus defined in claim 2, wherein said testing means comprises a plurality of electron tubes, circuit means controlled by said device for connecting said potentials to said tubes, relay means respectively coacting with each of said tubes, and circuit means controlled by said relay means for governing the operation of said first and said second device.

7. The apparatus defined in claim 6, comprising signal means respectively individual to said tubes, and circuit means controlled by said relay means responsive to failure of either of said tubes for operating the corresponding signal means.

8. The apparatus defined in claim 5, comprising additional common signal means, and circuit means for operating said additional common signal means coincident with the operation of said individual signal means.

9. Apparatus as defined in claim 1, wherein said first type switching means are successively actuated during the time of operative actuation of each of said second type switching means.

10. Apparatus as defined in claim 1, wherein stepping switches constitute said first and second device, each of said switches having bank contacts, said first type switching means being connected to bank contacts of one of said switches, and said second type switching means being connected to bank contacts of the other switch.

11. Apparatus as defined in claim 1, wherein stepping switches constitute said first and said second device, each of said switches having band contacts, said first type switching means being connected to bank contacts of one of said switches and said second type switching means being connected to bank contacts of the other switch, and means for successively stepping said other switch for successively connecting said second type switching means to said testing means to test the operatively effective actuated position and also the normal position of said second type switching means.

12. Apparatus as defined in claim 11, wherein said other switch comprises two wipers and bank contacts associated therewith, the actuated position of said second type switching means being tested by said testing means over one of said wipers and the normal position of such switching means being tested by said testing means over the other wiper conjointly with the testing of the actuation of the next successive first type switching means.

13. The apparatus defined in claim 1, comprising stepping switches constituting said first and said second device.

14. The apparatus defined in claim 1, wherein a first stepping switch constitutes said first device and a second stepping switch constitutes said second device, and means for advancing said second stepping switch by one step after each operating cycle of said first stepping switch during which such first switch is successively advanced a plurality of steps.

15. The apparatus defined in claim 1, wherein a first stepping switch constitutes said first device and a second stepping switch constitutes said second device, means for advancing said second stepping switch by one step after each operating cycle of said first stepping switch during which such first switch is successively advanced a plurality of steps, and control contact means for affecting the advance of said stepping switches.

16. The apparatus defined in claim 1, wherein a first stepping switch constitutes said first device and a second stepping switch constitutes said second device, means for advancing said second stepping switch by one step after each operating cycle of said first stepping switch during which such first switch is successively advanced a plurality of steps, a plurality of utilizing circuits connected with said generator, a plurality of control contact means respectively associated with said utilizing circuits, supervising switching means cooperating with said last named control contact means, and circuit means for said supervising switching means and said control contact means whereby said supervising switching means become operative over one of said control contact means responsive to failure of another such control contact means, and signal means actuated by said supervising switching means responsive to operation thereof.

No references cited.